US010886745B2

(12) United States Patent
Cowen, III (10) Patent No.: US 10,886,745 B2
(45) Date of Patent: Jan. 5, 2021

(54) VIRTUAL LOCALIZED ENERGY STORAGE DEVICES IN AN ELECTRICAL DISTRIBUTION SYSTEM

(71) Applicant: Cornell University, Ithaca, NY (US)

(72) Inventor: Edwin A. Cowen, III, Ithaca, NY (US)

(73) Assignee: Cornell University, Ithaca, NY (US)

(*) Notice: Subject to any disclaimer, the term of this patent is extended or adjusted under 35 U.S.C. 154(b) by 0 days.

(21) Appl. No.: 16/326,051

(22) PCT Filed: Aug. 17, 2017

(86) PCT No.: PCT/US2017/047388
§ 371 (c)(1),
(2) Date: Feb. 15, 2019

(87) PCT Pub. No.: WO2018/035348
PCT Pub. Date: Feb. 22, 2018

(65) Prior Publication Data
US 2019/0181642 A1    Jun. 13, 2019

Related U.S. Application Data

(60) Provisional application No. 62/376,778, filed on Aug. 18, 2016.

(51) Int. Cl.
*H02J 3/32* (2006.01)
*H02J 3/14* (2006.01)
(Continued)

(52) U.S. Cl.
CPC .............. *H02J 3/32* (2013.01); *G05B 13/042* (2013.01); *H02J 3/14* (2013.01); *H02J 3/28* (2013.01);
(Continued)

(58) Field of Classification Search
CPC ........ H02J 3/14; H02J 3/28; H02J 3/32; H02J 7/0069; H02J 13/0017; H02J 2203/20;
(Continued)

(56) References Cited

U.S. PATENT DOCUMENTS 8,457,802 B1* 6/2013 Steven ................. H02J 3/46
  700/291
9,026,347 B2* 5/2015 Gadh .................. B60L 11/1824
  701/123
(Continued)

FOREIGN PATENT DOCUMENTS

CN   104779658 A   7/2015
CN   105938165 A   9/2016
(Continued)

OTHER PUBLICATIONS

Fraunhofer, "Smart Meters to Use Algorithms to Analyze Electricity Consumption," Research News, Dec. 2016, 3 pages.
(Continued)

*Primary Examiner* — Crystal J Barnes-Bullock
(74) *Attorney, Agent, or Firm* — Ryan, Mason & Lewis, LLP (57) ABSTRACT

An apparatus in one embodiment comprises at least one processing device. The processing device comprises a processor coupled to a memory, and is configured to obtain energy usage data generated by advanced metering infrastructure of a particular energy usage location of an electrical distribution system, to model a virtual localized energy storage device for the particular energy usage location, and to execute an algorithm to control charging and discharging of the virtual localized energy storage device based at least in part on the energy usage data and associated pricing data of the electrical distribution system. The processing device is further configured to provide an interface through which a user can adjust one or more parameters for controlling (Continued)

energy usage at the particular energy usage location based at least in part on a charge state of the virtual localized energy storage device.

20 Claims, 4 Drawing Sheets

(51) Int. Cl.
*H02J 3/28* (2006.01)
*G05B 13/04* (2006.01)

(52) U.S. Cl.
CPC ....... *H02J 2203/20* (2020.01); *H02J 2310/14* (2020.01)

(58) Field of Classification Search
CPC .. H02J 2310/14; H02J 2310/64; G06Q 10/06; G06Q 10/0631; G06Q 30/0206; G06Q 50/06; G06F 1/263; G05F 1/66; G05B 13/042; B60L 53/63; B60L 53/64; B60L 55/00; B60L 2240/72; Y04S 10/12; Y04S 10/123; Y04S 10/126; Y04S 10/14; Y04S 10/54; Y04S 10/542; Y04S 20/12; Y04S 30/12; Y04S 40/22; Y04S 50/16; Y02T 10/7005; Y02T 10/7088; Y02T 90/128; Y02T 90/14; Y02T 90/163; Y02T 90/168; Y02E 10/563; Y02E 10/566; Y02E 10/763; Y02E 10/766; Y02E 40/72; Y02E 60/721; Y02E 60/722; Y02E 60/76
See application file for complete search history.

(56) References Cited

U.S. PATENT DOCUMENTS

| | | | |
|---|---|---|---|
| 9,063,525 B2 | 6/2015 | Sanders et al. | |
| 9,300,141 B2 | 3/2016 | Marhoefer | |
| 9,385,543 B2 | 7/2016 | Kachi | |
| 9,705,333 B2* | 7/2017 | Clifton | G05F 1/66 |
| 9,800,050 B2* | 10/2017 | Clifton | G05F 1/66 |
| 9,915,965 B2* | 3/2018 | Mohammed | G05F 1/66 |
| 9,960,637 B2* | 5/2018 | Sanders | H02J 3/383 |
| 10,008,903 B2* | 6/2018 | Paiz | H02K 7/025 |
| 10,140,585 B2* | 11/2018 | Fife | G05F 1/66 |
| 10,295,966 B2* | 5/2019 | Blackhall | G06Q 10/06 |
| 10,489,731 B2* | 11/2019 | Fife | G05B 13/021 |
| 2008/0052145 A1* | 2/2008 | Kaplan | G06Q 50/06 705/7.12 |
| 2011/0125337 A1* | 5/2011 | Zavadsky | H02J 3/14 700/291 |
| 2011/0245985 A1 | 10/2011 | Cooling | |
| 2013/0116952 A1 | 5/2013 | Chai | |
| 2014/0049216 A1 | 2/2014 | Nakagawa et al. | |
| 2014/0125125 A1 | 5/2014 | Wyatt | |
| 2014/0214219 A1* | 7/2014 | Katayama | H02J 3/28 700/291 |
| 2014/0214231 A1 | 7/2014 | Parsonnet et al. | |
| 2014/0257584 A1* | 9/2014 | Tanimoto | G06Q 50/06 700/291 |
| 2015/0142526 A1 | 5/2015 | Forbes, Jr. | |
| 2015/0161020 A1 | 6/2015 | Matsuoka et al. | |
| 2015/0234409 A1 | 8/2015 | Griner et al. | |
| 2015/0340900 A1 | 11/2015 | Sugimoto et al. | |
| 2016/0172859 A1 | 6/2016 | Marhoefer | |
| 2017/0005474 A1 | 1/2017 | Sanders et al. | |
| 2017/0005515 A1 | 1/2017 | Sanders et al. | |
| 2017/0076304 A1 | 3/2017 | Toth et al. | |
| 2017/0149246 A1 | 5/2017 | Storace et al. | |
| 2017/0207633 A1 | 7/2017 | Nakayama et al. | |
| 2020/0064786 A1* | 2/2020 | Blackhall | G06Q 10/06 |

FOREIGN PATENT DOCUMENTS

KR 101384847 B1 4/2014
WO PCT/US2017/047388 12/2017

OTHER PUBLICATIONS

Yu Wang, "Algorithms for Optimal Energy Management in the Smart Grid," A dissertation submitted to the Graduate Faculty of Auburn University, Aug. 1, 2015, 195 pages.
M. Chen et al., "Accurate Electrical Battery Model Capable of Predicting Runtime and I-V Performance," IEEE Transactions on Energy Conversion, Jun. 2006, pp. 504-511, vol. 21, No. 2.
K. Anderson et al., "GridSpice: A Distributed Simulation Platform for the Smart Grid," IEEE Transactions on Industrial Informatics, Nov. 2014, pp. 2354-2363, vol. 10, No. 4.
Eurobat, "Battery Energy Storage for Smart Grid Application," https://eurobat.org/sites/default/files/eurobat_smartgrid_publication_may_2013.pdf, May 2013, 20 pages.
M. Cheng et al., "Virtual Energy Storage System for Smart Grids," Energy Procedia, Jun. 2016, pp. 436-442, vol. 88.
G. Ceder et al., "Computational Modeling and Simulation for Rechargeable Batteries," MRS Bulletin, www.mrs.org/publications/bulletin, Aug. 2002, pp. 619-623, vol. 27, No. 8.
K. Young et al., "Electric Vehicle Battery Technologies," Springer Science and Business Media New York, 2013, pp. 15-56.
Jeff St. John, "Powerit: Don't Buy a Battery Until You've Tapped 'Virtual Storage," https://www.greentechmedia.com/articles/read/powerit-dont-buy-a-battery-until-youve-tapped-virtual-storage, May 6, 2015, 6 pages.
G. Kats et al., "How Virtual Storage Systems Turn Buildings into Batteries," https://www.greenbiz.com/blog/2012/11/01/virtual-storage-and-uncertainties-power-demand, Nov. 1, 2012, 7 pages.
X. Jin et al., "An Optimal Scheduling Model for a Hybrid Energy Microgrid Considering Building Based Virtual Energy Storage System," Energy Procedia, Jun. 2016, pp. 375-381, vol. 88.
L. Yao et al., "Optimal Charging and Discharging Scheduling for Electric Vehicles in a Parking Station with Photovoltaic System and Energy Storage System," Energies, Apr. 2017, 20 pages, vol. 10, No. 550.
E.M. Malatji et al., "Optimal Electricity Purchasing Model for Smart Homes Using Genetic Algorithm", IEEE 16th International Conference on Environment and Electrical Engineering (EEEIC), Jun. 7-10, 2016, 3 pages, Florence, Italy.
R. Uda et al., "Real-time Grid Simulation Platform for System Analysis Using Virtual Power Source," 18th Power Systems Computation Conference (PSCC), Aug. 18-22, 2014, 7 pages, Wroclaw, Poland.
M.B. Rasheed et al., "An Efficient Power Scheduling Scheme for Residential Load Management in Smart Homes," Applied Sciences, Nov. 12, 2015, pp. 1134-1163, vol. 5, No. 4.
P.H.L. Notten et al., "Battery Modeling: A Versatile Tool to Design Advanced Battery Management Systems," Advances in Chemical Engineering and Science (ACES), Jan. 2014, pp. 62-72, vol. 4, No. 1.
Sunverge, "Sunverge Announces Next-Generation Energy Storage System," http://www.sunverge.com/sunverge-announces-next-generation-energy-storage-system/, Feb. 9, 2016, 4 pages.
Katrin Nikolaus, "Pictures of the Future," The Magazine for Research and Innovation, https://www.siemens.com/innovation/en/home/pictures-of-the-future/energy-and-efficiency/smart-grids-and-energy-storage-caterva.html, Jul. 31, 2015, 4 pages.
Sunverge, "More Than Batteries—Turning Distributed Energy Storage into a Virtual Power Plant," UtilityDive.com, 2017, 12 pages.
Peter Asmus, "Microgrids, Virtual Power Plants and Our Distributed Energy Future," The Electricity Journal, Dec. 2010, pp. 72-82, vol. 23, No. 10.
Ł. Nikonowicz et al., "Virtual Power Plants—General Review: Structure, Application and Optimization," Journal of Power Technologies, 2012, pp. 135-149, vol. 92, No. 3.

\* cited by examiner

VIRTUAL LOCALIZED ENERGY STORAGE DEVICES IN AN ELECTRICAL DISTRIBUTION SYSTEM

PRIORITY CLAIM

The present application claims priority to U.S. Provisional Patent Application Ser. No. 62/376,778, filed Aug. 18, 2016 and entitled "Virtual Storage to Simulate Rechargeable Batteries," which is incorporated by reference herein in its entirety.

FIELD

The field relates generally to electrical distribution, and more particularly to techniques for computer simulation of energy storage devices.

BACKGROUND

Some electrical distribution systems are configured to deploy rechargeable batteries or other types of physical energy storage devices at respective energy usage locations. For example, such energy storage devices may be deployed at the residences of customers of an electric utility or other energy service provider. However, energy storage devices are typically very expensive to deploy. Moreover, such arrangements can be difficult to modify or otherwise reconfigure once deployed. A need exists for techniques that can alleviate these and other problems associated with implementation of a given physical deployment of energy storage devices in an electrical distribution system.

SUMMARY

Illustrative embodiments of the invention provide systems for simulating rechargeable batteries or other types of localized energy storage devices that may be deployed in conjunction with smart meters or other types of advanced metering infrastructure in an electrical distribution system.

For example, an apparatus in one embodiment comprises at least one processing device. The processing device comprises a processor coupled to a memory, and is configured to obtain energy usage data generated by advanced metering infrastructure of a particular energy usage location of an electrical distribution system, to model a virtual localized energy storage device for the particular energy usage location, and to execute an algorithm to control charging and discharging of the virtual localized energy storage device based at least in part on the energy usage data and associated pricing data of the electrical distribution system. The processing device is further configured to provide an interface through which a user can adjust one or more parameters for controlling energy usage at the particular energy usage location based at least in part on a charge state of the virtual localized energy storage device.

The above-noted algorithm in some embodiments is illustratively configured to favor charging the virtual localized energy storage device at times when the pricing data indicates that a price per unit of energy is relatively low and is configured to favor discharging the virtual localized energy storage device at times when the pricing data indicates that the price per unit of energy is relatively high.

Customers in some embodiments may be billed by an electric utility or other energy service provider at the relatively low price per unit of energy for any amounts of actual energy usage that are covered by charging that occurred at that relatively low price in their respective virtual localized energy storage devices.

Separate instances of the virtual localized energy storage device may be implemented by the one or more processing devices for respective ones of a plurality of energy usage locations of the electrical distribution system.

The separate instances of the virtual localized energy storage devices may be scaled to simulate physical deployment of a distributed arrangement of actual localized energy storage devices across potentially large numbers of respective energy usage locations of the electrical distribution system without requiring deployment of the actual localized energy storage devices at any of the energy usage locations.

Other examples of illustrative embodiments include a smart service system that comprises a potentially large number of smart meters implemented at respective residences, businesses or other energy usage locations. The smart meters are networked with one or more central servers. A simulation system incorporated in, coupled to or otherwise associated with at least one central server provides simulated localized storage for respective ones of the smart meter locations. Such an arrangement advantageously allows a wide variety of different localized storage arrangements and associated configuration parameters to be tested and evaluated through interaction with actual energy consumers, but without requiring deployment of any physical storage devices and therefore at extremely low cost.

These and other illustrative embodiments of the invention include but are not limited to systems, methods, apparatus, processing devices, integrated circuits and computer program products comprising processor-readable storage media having software program code embodied therein.

DETAILED DESCRIPTION

Embodiments of the invention can be implemented, for example, at least in part in the form of information processing systems comprising computer networks or other arrangements of networks, clients, servers, processing devices and other components. Illustrative embodiments of such information processing systems and associated electrical distribution systems will be described in detail herein. For example, smart meters of an electrical distribution system may operate as clients relative to one or more central servers that implement or otherwise interact with a simulation system providing virtual storage and associated time-varying pricing signals. It should be understood, however, that embodiments of the invention are more generally applicable to a wide variety of other types of information processing systems and associated networks, clients, servers, processing devices or other components.

Accordingly, the term "information processing system" as used herein is intended to be broadly construed so as to encompass these and other arrangements. Such information processing systems illustratively comprise localized storage simulation systems that are implemented in conjunction with other types of systems and devices, such as power grids, electrical distribution systems and smart metering arrangements.

An "electrical distribution system" as that term is used herein is also intended to be broadly construed and may encompass at least a portion of a power grid or other types of electrical distribution infrastructure, possibly including smart meters arranged at respective energy usage locations.

Some embodiments comprise potentially large numbers of networked smart meters that are deployed in association with respective instances of virtual storage. The virtual storage instances simulate actual physical storage devices or combinations of multiple such devices that may be deployed at the corresponding smart meter locations. One or more computers, servers or other processing devices of a processing platform are configured to provide the virtual storage for the respective smart meter locations as part of a simulation. In conjunction with the simulation, signals generated under the control of at least one processing device of the processing platform are provided over one or more networks to one or more of the smart meters. Such signals can include dynamic time-varying pricing signals. Simulated storage can take advantage of the dynamic time-varying pricing signals to make a decision about when to charge (purchase) and when to discharge (forgo a purchase).

Illustrative embodiments leverage localized storage and associated smart meters to provide a smart service system. Advanced Metering Infrastructure (AMI) or simply "smart meters" have been widely deployed and yet their promises of reduced peak electricity, greenhouse gas reductions, demand management, and a more energy-engaged society are yet to materialize. A lack of distributed storage capacity, co-located with individual smart meters, stands as a barrier to the development of a true retail electricity market. To date, the design and deployment of AMI has been driven from the utility/industry perspective, with the consumer being largely absent from the process.

Such drawbacks are overcome in illustrative embodiments through the use of virtual storage models that simulate the impact of physical storage on customer behavior, which minimizes the cost to study its impact, and allows the identification of business opportunities at low cost and risk. A given implementation illustratively associates computer simulated localized storage ("virtual storage") with respective smart meters. The virtual storage more particularly simulates localized storage devices such as rechargeable batteries or electric vehicles at the particular residence, business or other energy usage locations of respective ones of the smart meters. Such arrangements advantageously provide a smart service system that enables a retail energy market that supports new revenue streams for the utilities, identifies potential new business opportunities, while providing economic, robustness, and environmental stewardship advantages to customers.

The smart service system in some embodiments comprises a fully instrumented, control and communication capable, smart service system that includes AMI at the individual residence level, in combination with virtual storage simulation modeling tools that allow integration of localized storage into the AMI to enable the efficient testing of different time-varying rate scenarios at low cost.

This smart service system advantageously realizes the thus far unrealized savings for consumers, while creating potential new business opportunities, such as an aggregator who provides the services of storage, smart service system software, and financing to the residential sector, while bundling the distributed demand management opportunities and providing this to the grid operator.

The grid operator may be an electric utility, an independent system operator (ISO) or another type of entity.

Entities such as the above-noted grid operator and aggregator are examples of what are more generally referred to herein as "energy service providers."

Illustrative embodiments provide the infrastructure for a retail energy market creating significant reductions in peak electricity demand, allowing substantial integration of distributed renewable generation (e.g., rooftop solar), and provide grid operators with a financially net positive alternative to net metering. The results are highly marketable and readily transferable to other utilities throughout the U.S. and the world.

In some embodiments, an existing electric grid is coupled with computer modeling of rechargeable batteries to simulate the effect of distributed rechargeable battery deployment on electric grid operations. This allows studies of high-penetration of localized storage to be carried out at very low cost.

The virtual storage is illustratively implemented in software and tracks internal charge status (e.g., full, partially full, empty), self-discharge rate (all batteries slowly lose charge) and all other operational parameters of physical storage. For example, a given virtual battery can be configured to track a virtual charge level at a current time-varying price for electricity and then this stored electricity is then available to be used (e.g., discharged) at later times when the cost of electricity is presumably higher.

Simulations of rechargeable batteries or other localized storage within an electrical distribution system allows the efficient testing of the effects of such localized storage on the operation of the system in which it is installed.

Such arrangements allow testing and optimization of battery size, operation and pricing strategies for large numbers of customers without requiring actual deployment of physical localized storage. The device costs associated with deployment of physical localized storage are currently about $300 per kW-hour, not including installation. The total cost including installation is significantly higher. For example, installation of a typical individual battery with a storage capacity of 10 kW-hours can have a total cost in excess of $6,000.

Illustrative embodiments can more fully achieve the potential of smart meters by shifting the local highly granular timescale of market-based electric energy decisions out to the consumer level through a smart service system. These embodiments leverage AMI functionality to optimize the use of distributed storage in a smart service system that taps into a real-time retail energy market that reacts to price signals automatically to achieve energy distribution goals (e.g., energy demand peak smoothing, high penetration of distributed (i.e., local) renewables, greenhouse gas reductions).

In some embodiments, a smart service system comprises AMI including large numbers (e.g., many thousands) of smart meters associated with respective residences, businesses or other energy usage locations. The smart meters are networked to one or more central servers in a manner that allows two-way communication between each smart meter and at least one central server.

The smart service system also comprises virtual storage which includes a computationally simulated local rechargeable battery or other localized storage associated with respective ones of the smart meters at the corresponding residence or business. Such an arrangement advantageously permits rapid testing of time-varying pricing models on various simulated storage designs and configurations. For example, various parameters of the simulated localized storage such as number and type of storage devices, storage capacities, charge and discharge rates, costs and other parameters can be easily varied and the corresponding impact on consumer behavior or other aspects of system operation can be readily determined.

In some embodiments, the virtualized storage is provided for statistically significant subsets of the smart meters (e.g., subsets of approximately 300) in order to run multiple tests at once using different groups of smart meters.

The illustrative embodiments allow the market-making impact of particular localized storage configurations to be tested at extremely low cost as no physical localized storage is required.

In some embodiments, residential customers, if they choose to purchase virtual storage (e.g., a modeled battery, at a particular monthly cost or other fee structure), can virtually purchase electricity at off-peak, low prices to be used at times of peak electricity prices. With the smart meter they will be billed as if these were actual transactions. Further, the system can be used to test at what level of penetration distributed storage with AMI is required to have an impact, as well as develop curves of benefit vs. penetration as measured from the perspective of the residential user (i.e., the stakeholder), the grid operator, and a residential storage aggregator.

In some embodiments, this system, which may be fully integrated by an aggregator, will be "smart" in the sense that routine operations, such as adapting demand to the available pricing opportunities (e.g., making the decision to purchase electricity at the current price for direct use or storage versus forgoing electricity purchase and opt to run the household from storage), will be essentially transparent to the consumer.

These and other embodiments provide value for consumers in a retail energy market while also providing economic opportunities for grid operators, aggregators and physical storage device manufacturers.

It should be noted that a "physical storage device" as that term is broadly used herein is intended to include an arrangement of one or more stand-alone rechargeable batteries as well as other types of localized storage devices such as an electric vehicle ("EV"). Virtual storage in illustrative embodiments is used to simulate various arrangements of these and other types of localized storage devices that may be provided at a given residence, business or other energy usage location in association with at least one corresponding smart meter.

The stand-alone rechargeable batteries are generally more flexible as stand-alone storage can be designed specifically to address business opportunities that emerge. In particular, it acts readily as both a distributed source and a distributed demand for energy.

It is also possible for EVs to be configured with this same dual-direction flexibility, using vehicle-to-grid (V2G) arrangements. Thus, some embodiments can utilize EVs as both distributed sources of energy and distributed demands for energy, configured for both discharging to the grid and charging from the grid, respectively.

In other embodiments, EVs can be configured to run in only one direction—charging only (i.e., distributed demand).

These and other EV arrangements are advantageous for multiple reasons: distributed demand allows variable charging rates that enables load shifting (distributed demand management), it acts as a buffer to the integration of distributed generation, and it provides a secondary value to owning an EV, thereby increasing its economic attractiveness as well as providing other societal benefits, and helping to accelerate EV penetration.

In some embodiments, virtual storage models are configured to minimize the cost to study the impact of localized storage and to identify potential business opportunities at low cost and low risk.

For example, assuming that each smart meter can track the amount of electric energy that passes through the meter over relatively granular time increments (e.g., hourly increments), time-varying pricing can be applied to these time increments. This price signal can easily be leveraged to mimic the presence of actual physical storage. In one possible implementation of such an arrangement, energy usage per hour or other time unit is tracked, and homes are programmed to have virtual batteries that can be "charged" until they are full at the current time's price and then "discharged" at that price at some future time, presumably when the then-current rates are considerably higher.

The actual energy in such an arrangement is still being provided by the grid, but the pricing signal will act as if a physical battery were in place at the corresponding location. From the residential consumer's perspective, the household is now billed as if they had a localized battery able to take advantage of lower price period energy to charge and higher price period energy to discharge, rather than going out to the grid to purchase energy. Various fee structures can be provided to the consumer for use of the virtual battery, based on business models developed for consumer storage acquisition. Such business models can include, for example, a lease price or an ownership model coupled with incentives.

An embodiment of this type ensures that consumers see monthly bills that reflect the true costs of localized storage. With such virtual storage associated with their smart meter and with time-varying electricity rates, they will realize all net savings that occur. Such arrangements help to realize the market-making ability of AMI by freeing individual residences from always needing to buy power from the grid at the current price without installing local generation and by shifting the cost and effort of installing the total amount of storage to potentially tens of millions of individual consumers.

The virtual storage in the illustrative embodiments can model a wide variety of prototype physical storage solutions, both existing designs and new designs with new performance characteristics, as well as combinations of multiple physical storage devices of different types at different locations.

In some embodiments, the smart service system comprises smart control software operating a distributed network of smart meters coupled to localized storage by targeted consumers that enables a retail energy market while providing new revenue stream for the utilities, a potential new business opportunity for aggregators, and economic, robustness, and environmental stewardship advantages to customers. In addition, such arrangements can significantly expand the market for residential-scale original equipment manufacturer (OEM) storage solutions as well as add a new value stream to EVs.

These and other embodiments can advantageously simulate distributed residential storage at scale, but it is to be appreciated that the disclosed arrangements are not limited to residential energy consumers.

A number of illustrative embodiments will now be described in more detail with reference to FIGS. 1 through 4. It is to be appreciated that these embodiments, like the others disclosed herein, are presented by way of illustrative example only, and should not be construed as limiting in any way.

Figure 1:
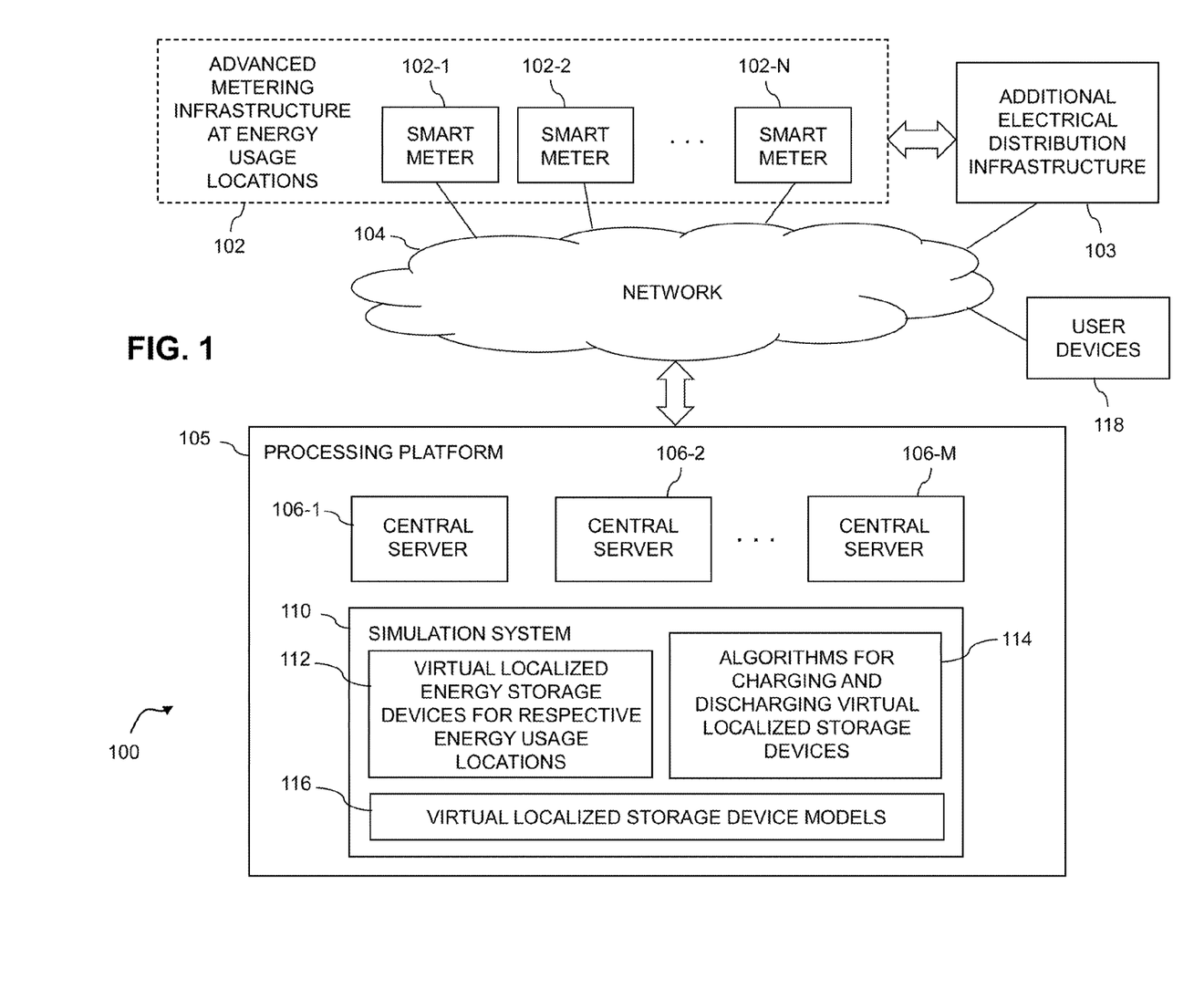
FIG. 1 is a block diagram of an information processing system configured with functionality for implementing virtual localized energy storage devices for respective energy usage locations of an electrical distribution system in an illustrative embodiment.

Referring initially to FIG. 1, an information processing system 100 is configured with functionality for implementing virtual localized energy storage devices for respective energy usage locations of an electrical distribution system. The information processing system 100 includes AMI that more particularly comprises smart meters 102-1, 102-2, . . . 102-N arranged at respective energy usage locations. The AMI comprising smart meters 102 is coupled to additional electrical distribution infrastructure 103 that is assumed to be associated with a smart grid or other power grid of an electric utility, ISO or other energy service provider. The additional electrical distribution infrastructure 103 is further assumed to provide the actual electrical energy to the residences, businesses or other energy usage locations at which respective ones of the smart meters 102 are deployed.

The smart meters 102 and additional electrical distribution infrastructure 103 are configured to communicate over network 104 with a processing platform 105. The processing platform 105 is assumed to comprise one or more processing devices each comprising a processor coupled to a memory. For example, the processing platform 105 can comprise multiple networked processing devices implemented at least in part utilizing virtual machines or other types of cloud-based virtualization infrastructure. The processing platform 105 can therefore be implemented as a cloud-based processing platform configured to receive energy usage data from the smart meters 102 and associated pricing data from the additional electrical distribution infrastructure 103 over the network 104.

The network 104 can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks. Accordingly, references herein to network 104 should be understood to encompass arrangements involving a single network as well as arrangements involving multiple networks of potentially different types.

The processing platform 105 in this embodiment comprises a plurality of central servers 106-1, 106-2, . . . 106-M that are configured to receive energy usage data generated by the smart meters 102. Although each such smart meter is illustratively associated with a corresponding one of a plurality of energy usage locations, it is to be appreciated that a given energy usage location can include multiple smart meters. The AMI in this embodiment is therefore assumed to comprise at least one smart meter implemented at any particular energy usage location. The smart meters 102 are illustratively implemented to operate as respective clients relative to one or more of the central servers 106.

The variables N and M referred to above are assumed to be arbitrary and unrelated integers each greater than or equal to two.

The central servers 106 of processing platform 105 are configured to obtain energy usage data from the one or more smart meters 102 associated with a particular energy usage location. The central servers 106 can also be configured to receive pricing data from the additional electrical distribution infrastructure 103. The energy usage data can be received in one or more of the central servers 106 from a given one of the smart meters 102 at predefined intervals. For example, such energy usage data could be provided by the given one of the smart meters 102 at 15 minute intervals, or using shorter or longer intervals.

The pricing data can be similarly provided to the central servers 106 by the additional electrical distribution infrastructure 103. For example, the pricing data can in some cases comprise actual real-time rates for energy usage on a price per unit of energy basis, although numerous other pricing data formats can be used. Additional or alternative types of pricing data that may be used in a given embodiment include day-ahead time varying rates or other time-varying electrical rates that may be utilized by a given utility, ISO or other energy service provider.

The processing platform 105 further comprise a simulation system 110 that models a virtual localized energy storage device for the particular energy usage location, and executes an algorithm to control charging and discharging of the virtual localized energy storage device based at least in part on the energy usage data and associated pricing data of the electrical distribution system. The processing platform 105 also provides an interface through which a user can adjust one or more parameters for controlling energy usage at the particular energy usage location based at least in part on a charge state of the virtual localized energy storage device. Such operations are replicated for additional virtual localized energy storage devices of respective additional energy usage locations.

Accordingly, the simulation system 110 of processing platform 105 implements multiple virtual localized energy storage devices 112 for respective energy usage locations. The virtual localized energy storage devices 112 are maintained utilizing algorithms 114 for charging and discharging of those devices and are configured in accordance with virtual localized storage device models 116. Different ones of the virtual localized energy storage devices 112 provided for respective different energy usage locations can utilize different ones of the algorithms 114 and models 116. Alternatively, the same model and algorithm can be used for each of the virtual localized energy storage devices 112.

A given one of the models 116 is illustratively configured to model a virtual localized energy storage device as one or more rechargeable batteries, one or more electric vehicles, or as other types of devices capable of storing electrical charge provided by the electrical distribution system. Combinations of multiple such arrangements may also be used in modeling a virtual localized energy storage device. For example, a given such device can be modeled as a combination of one or more rechargeable batteries and one or more electric vehicles, each providing a particular energy storage capacity. Alternatively, separate virtual localized energy storage devices can be modeled for the rechargeable batteries and for the electric vehicles. It is therefore possible for the simulation system 110 to associate multiple ones of the virtual localized energy storage devices 112 with a single energy usage location in other embodiments. It is also possible for a virtual localized energy storage device to be formed as a composite of multiple such devices.

The given one of the models 116 can be configured to model the virtual localized energy storage device by specifying total energy storage capacity, charging and discharging rates, and potentially one or more of internal dissipation, duty cycle effects and performance degradation over time for the virtual localized energy storage device. Additional or alternative characteristics may be used in other embodiments. These and other combinations of specified virtual localized energy storage device characteristics collectively provide illustrative examples of a "model" as that term is broadly used herein.

In some embodiments, the virtual localized energy storage device does not include any localized energy storage device that is physically present at the particular energy usage location. However, as indicated above, it is possible to configure the virtual localized energy storage device to include one or more physical devices such as an electric vehicle that is determined to be present at the energy usage location. A given virtual localized energy storage device can also be configured to model multiple such physical devices that are determined to be present at the energy usage location.

The above-noted algorithm in some embodiments is illustratively configured to favor charging the virtual localized energy storage device at times when the pricing data indicates that a price per unit of energy is relatively low and is configured to favor discharging the virtual localized energy storage device at times when the pricing data indicates that the price per unit of energy is relatively high.

Customers in some embodiments may be billed by an electric utility, ISO or other energy service provider at the relatively low price per unit of energy for any amounts of actual energy usage that are covered by charging that occurred at that relatively low price in their respective virtual localized energy storage devices.

In arrangements of this type, the customers are billed as if the virtual localized energy storage devices were in fact physically present at the respective energy usage locations. For example, the utility can charge a given customer at a relatively low rate applicable when the virtual localized energy storage device was being charged rather than at a relatively high current rate that would otherwise be charged absent availability of stored charge in the virtual localized energy storage device.

Customers can therefore obtain the advantages of localized energy storage in terms of altering their usage habits to reduce their utility bills, without the customers or the utility incurring the substantial costs associated with an actual physical deployment of localized energy storage devices.

The utility, ISO or other energy service provider in some embodiments can sell or lease virtual localized energy storage devices to customers at residences or businesses that are equipped with smart meters or other similar AMI.

One or more of the algorithms 114 can be configured to control charging and discharging of the virtual localized energy storage devices 112 in a manner that attempts to minimize a total cost for energy usage at the respective energy usage locations.

The interface provided by the processing platform 105 to a given residential energy customer or other user of the system 100 allows that user to adjust one or more parameters for controlling energy usage at a corresponding energy usage location based at least in part on a charge state of its virtual localized energy storage device. For example, the interface in some embodiments comprises a web-based portal accessible via a corresponding one of the user devices 118 over the network 104.

The user devices 118 illustratively comprise mobile telephones, tablet computers, laptop computers, desktop computers or other types of processing devices having access to an interface of the processing platform 105 over the network 104. The user devices 118 need not be co-located with the energy usage locations of their respective users.

For example, a user associated with a particular residence for which a virtual localized energy storage device is implemented by the simulation system 110 can check the charge state of that virtual localized energy storage device from a remote location when away from the residence, possibly utilizing an application running on a mobile telephone. Such a mobile application interacts with a web-based portal or other interface provided by the processing platform 105. The user can also utilize the application running on the mobile telephone to adjust one or more parameters for controlling energy usage at the residence based at least in part on the charge state of its virtual localized energy storage device.

As noted above, separate ones of the virtual localized energy storage devices 112 are implemented for respective ones of a plurality of energy usage locations of the electrical distribution system, such as different residences or businesses served by the electrical distribution system.

Such separate instances of virtual localized energy storage devices 112 may be scaled to simulate physical deployment of a distributed arrangement of actual localized energy storage devices across potentially large numbers of respective energy usage locations of the electrical distribution system without requiring deployment of the actual localized energy storage devices at any of the energy usage locations. For example, test beds or other simulation arrangements can be configured in which hundreds or thousands of the virtual localized energy storage devices are deployed at respective designated locations served by an electrical distribution system in order to accurately determine changes in user behavior and associated energy demands that would result from such a deployment.

Illustrative embodiments can therefore be configured to operate hundreds or thousands of the modeled virtual localized storage devices and aggregate results to model and test a given physical installation of energy storage devices.

Figure 2:
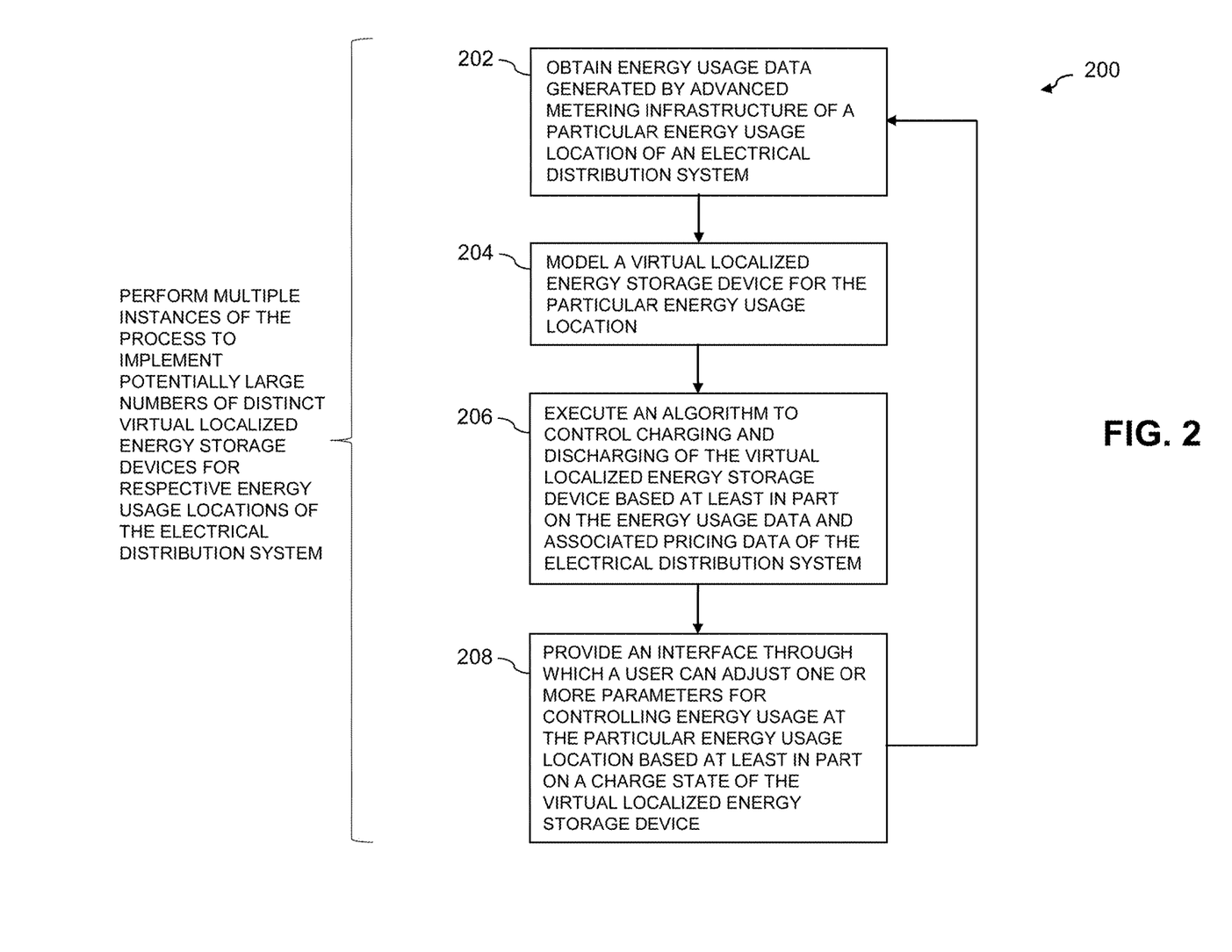
FIG. 2 is a flow diagram of a process for implementing a virtual localized energy storage device for a given energy usage location in an illustrative embodiment.

FIG. 2 illustrates an example process 200 for implementing a virtual localized energy storage device for a given energy usage location in an illustrative embodiment. The process includes steps 202 through 208.

The process 200 is assumed to be performed by at least one processing device comprising a processor coupled to a memory. For example, the process 200 can be performed by one or more networked processing devices of a given cloud-based processing platform such as processing platform 105 of FIG. 1. Other types of processing devices that may be utilized to implement at least portions of the process 200 in other embodiments include smart meters and smart home controllers. Examples of the latter types of embodiments will be further described below in conjunction with FIGS. 3 and 4.

Each of the individual steps of the process 200 will now be described in further detail. In step 202, energy usage data is obtained. The energy usage data is generated by AMI of a particular energy usage location of an electrical distribution system. For example, the energy usage data can be obtained from one or more smart meters deployed at the particular energy usage location.

In step 204, a virtual localized energy storage device is modeled for the particular energy usage location. The virtual localized energy storage device may be modeled as a rechargeable battery of a particular type and size (e.g., 1 to 30 kW-hours), having specified characteristics such as charging and discharging rates, internal dissipation, duty cycle effects, performance degradation over time, etc. Combinations of multiple different energy storage devices of potentially different types, including electric vehicles, can be used in modeling the virtual localized energy storage device.

In step 206, an algorithm is executed to control charging and discharging of the virtual localized energy storage device based at least in part on the energy usage data and associated pricing data of the electrical distribution system. For example, the algorithm may be configured to favor charging the virtual localized energy storage device at times when the pricing data indicates that a price per unit of energy is relatively low and is configured to favor discharging the virtual localized energy storage device at times when the pricing data indicates that the price per unit of energy is relatively high.

The algorithm can therefore be configured to determine when the price is relatively low and in effect buy electricity at that price by charging the virtual localized energy storage device. Similarly, the algorithm can be configured to determine when the price is relatively high and in effect forego the purchase of electricity at that price by discharging the virtual localized energy storage device. During discharge periods of the virtual localized energy storage device, the customer is billed the relatively low price at which that device was charged until the device is completely discharged. Such embodiments are illustratively configured to track the charge state of the virtual localized energy storage device and so can readily determine when the device is completely discharged.

Various moving averages or other types of statistics characterizing the changes in price over time can be used by the algorithm to determine when the price is sufficiently low or high to respectively charge or discharge the virtual localized energy storage device. Such price statistics and other related information are illustratively maintained in conjunction with the ongoing execution of the algorithm.

In step 208, an interface is provided through which a user can adjust one or more parameters for controlling energy usage at the particular energy usage location based at least in part on a charge state of the virtual localized energy storage device.

For example, a customer can set parameters such as a risk aversion to being charged a peak electricity price. The setting of this parameter will control the aggressiveness of the algorithm in discharging the virtual localized energy storage device.

As another example, a customer can set operational tolerances on controllable loads such as air conditioning, dishwasher, hot water heater, laundry, etc. This illustratively involves establishing flexible time periods and setting other variable parameters for use of such controllable loads.

As a further example, a customer can set time periods for charging an electric vehicle and an amount of charge needed by a particular time for the electric vehicle.

A monthly bill provided by a utility, ISO or other energy service provider can reflect the energy charges that would have occurred if the virtual localized energy storage device was actually physically present at the energy usage location. For example, the customer is illustratively provided with a 10 kW-hour charge in its virtual localized energy storage device at relatively low prices overnight with that amount of charge then being available to discharge during the following day when prices are higher.

As noted above, a utility, ISO or other energy service provider in some embodiments can sell or lease virtual localized energy storage devices to customers at residences or businesses that are equipped with smart meters or other similar AMI.

The process 200 returns from step 208 back to step 202 to illustrate that the steps are performed substantially continuously for as long as the virtual localized energy storage device is implemented for the particular energy usage location. Additional or alternative return arrangements to and from different steps can be used. Variations may be made in the model and/or the algorithm over time.

The steps need not be performed in the exact order illustrated. For example, at least some of the steps can each be performed at least in part in parallel with one or more other ones of the steps. It is also possible that the steps can be reordered in other embodiments. Accordingly, the process 200 should not be construed as being limited to any particular strict sequential arrangement of operations.

As indicated at the left side of FIG. 2, multiple instances of the process 200 are performed to implement potentially large numbers of distinct virtual localized energy storage devices for respective energy usage locations of the electrical distribution system. The term "large numbers" as used herein is intended to refer to numbers on the order of hundreds, although it is to be appreciated that other embodiments could implement smaller numbers of virtual localized energy storage devices within a given system.

The process steps of FIG. 2 may be performed by the processing platform 105 utilizing its simulation system 110 in the context of information processing system 100 of FIG. 1. However, similar processes can be used to implement virtual localized storage devices in other types of information processing systems, such as the systems to be described below in conjunction with FIGS. 3 and 4.

The system 100 of FIG. 1 may be viewed as an embodiment in which a cloud-based processing platform 105 implements virtual localized energy storage devices 112 for respective energy usage locations. The energy usage data generated by the AMI comprising smart meters 102 is provided to the processing platform 105 over network 104. The pricing data is also available to the processing platform 105. For example, the pricing data may be supplied to the processing platform 105 from additional electrical distribution infrastructure 103 or from other suitable sources. It is also possible for the processing platform 105 to pull the pricing data from one or more designated sources on an as-needed basis.

One or more of the algorithms 114 running in the simulation system 110 of the processing platform 105 operate the virtual localized energy storage devices 112 in accordance with the corresponding models 116. The processing platform 105 also provides interfaces that are accessible via user devices 118 for adjusting parameters relating to energy usage at the corresponding energy usage locations and checking charge levels or other charge state information relating to the virtual localized energy storage devices 112. For example, each customer of a utility, ISO or other energy service provider may be provided with secure access to a corresponding account via a mobile application or other suitable web-based interface.

As indicated previously, illustrative embodiments are not limited to cloud-based processing platform arrangements. Other types of processing platforms and also individual processing devices may be used to implement illustrative embodiments. For example, smart meters and smart controllers can be used to implement virtual localized energy storage devices for their respective energy usage locations, as will now be described in more detail with reference to FIGS. 3 and 4.

Figure 3:
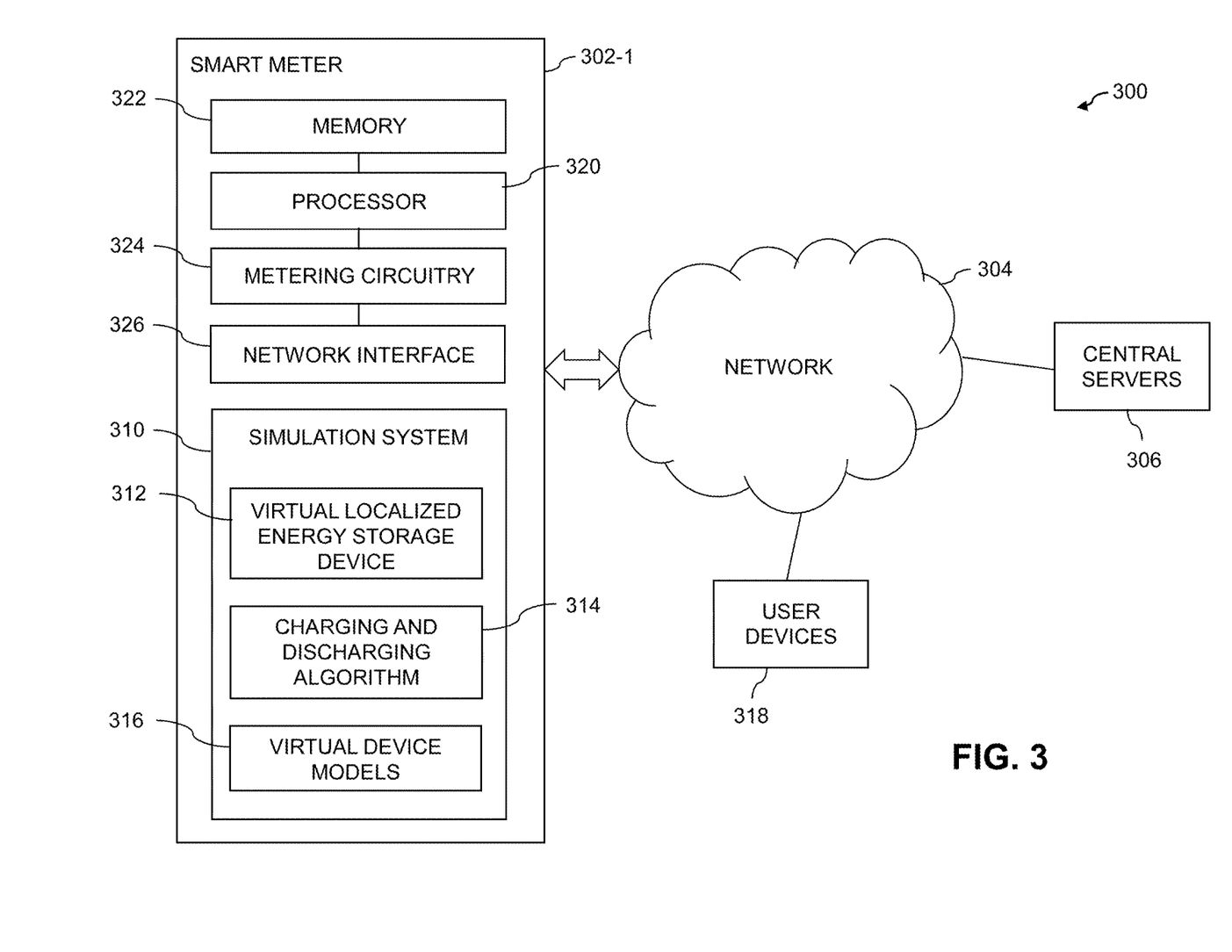
FIG. 3 shows an information processing system in which a virtual localized energy storage device is implemented in a smart meter in an illustrative embodiment.

Referring now to FIG. 3, an information processing system 300 comprises a smart meter 302-1 configured to communicate over network 304 with central servers 306. The smart meter 302-1 is assumed to be deployed at a particular energy usage location, such as a residence or a business.

In this embodiment, the smart meter 302-1 includes a simulation system 310 that implements a virtual localized energy storage device 312 for the corresponding energy usage location. The simulation system 310 further comprises an algorithm 314 for charging and discharging the virtual localized energy storage device 312 in accordance with a particular one of a plurality of virtual energy storage device models 316.

The simulation system 310 of smart meter 302-1 generally operates in a manner similar to the simulation system 110 of FIG. 1 as previously described, but implements only virtual localized storage device 312 for the particular energy usage location at which the smart meter 302-1 is deployed.

Accordingly, the FIG. 3 embodiment is one possible example of an arrangement in which a processing device implementing a virtual localized energy storage device is part of the AMI of the particular energy usage location. The smart meter 302-1 is considered a type of "processing device" as that term is broadly used herein. In the FIG. 3 embodiment, the modeling of the virtual localized energy storage device 312 and execution of the algorithm 314 to control charging and discharging of the virtual localized energy storage device 312 are implemented in one or more modules of the smart meter 302-1.

For example, each of the components 312, 314 and 316 may be implemented as a separate module of the smart meter 302-1. Such modules can be implemented at least in part in the form of software, although hardware and firmware can additionally or alternatively be used to implement such components of the simulation system 310.

In the FIG. 3 embodiment, the smart meter 302-1 receives pricing data over the network 304 from one or more of the central servers 306. Energy usage data is obtained by the simulation system 310 and utilized in conjunction with the pricing data in executing the algorithm 314 to operate the virtual localized energy storage device 312 in accordance with its corresponding one of the models 316.

The algorithm 314 and models 316 can be at least in part downloaded to the smart meter 302-1 over network 304 from one or more of the central servers 306. Although multiple models 316 are accessible to the simulation system 310 in this embodiment, in other embodiments the smart meter 302-1 can include only a single model for use in implementing the virtual localized energy storage device 312.

The smart meter 302-1 also provides an interface that is accessible from one or more user devices 318. For example, such an interface illustratively allows a user associated with one or more of the user devices 318 to check the current charge state of the virtual localized energy storage device 312 and to adjust one or more parameters for controlling energy usage at the particular energy usage location based at least in part on the charge state of the virtual localized energy storage device 312.

As mentioned previously herein, such an interface may be accessible via an application running on a mobile telephone. Such an application can additionally or alternatively run on a desktop, laptop or tablet computer. These and other devices are examples of possible instances of the user devices 318.

A given one of the user devices 318 illustratively comprises a terminal within the residence or business at the energy storage location. In other embodiments, such a terminal can be integrated with the smart meter 302-1 such that above-noted interface can be accessed by a user through a touch-control display or other similar mechanism of the smart meter 302-1.

The smart meter 302-1 further comprises a processor 320, a memory 322, metering circuitry 324 and a network interface 326.

The processor 320 executes software program code stored in the memory 322 in order to control the performance of internal processing operations and other functionality of the smart meter 302-1. For example, various energy usage metering functions of the metering circuitry 324 can be controlled at least in part by the processor 320 using such software program code stored in memory 322.

The processor 320 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination. For example, a given module of simulation system 310 can be implemented using such circuitry.

The memory 322 stores software program code for execution by the processor 320 in implementing portions of the functionality of the processing device. A given such memory that stores such program code for execution by a corresponding processor is an example of what is more generally referred to herein as a processor-readable storage medium having program code embodied therein, and may comprise, for example, electronic memory such as static random access memory (SRAM), dynamic random access memory (DRAM), or other types of RAM, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry such as processor 320 and metering circuitry 324. Such processing circuitry is configured to implement processing operations associated with smart metering in conjunction with virtual storage simulating localized storage, as well as other related functionality.

The metering circuitry 324 is configured to implement conventional metering processes that are well-known to those skilled in the art. Such processes are utilized to generate energy usage data that is obtained by the simulation system 310 for use in execution of algorithm 314 for operating virtual localized energy storage device 312.

The network interface 326 comprises one or more transceivers configured to allow the smart meter 302-1 to communicate over network 304 with central servers 306 and user devices 318. The smart meter 302-1 can additionally utilize network interface 326 to communicate with other system components not explicitly shown. Such system components may include components of additional electrical distribution infrastructure of an electrical distribution system in which the smart meter 302-1 is deployed.

Figure 4:
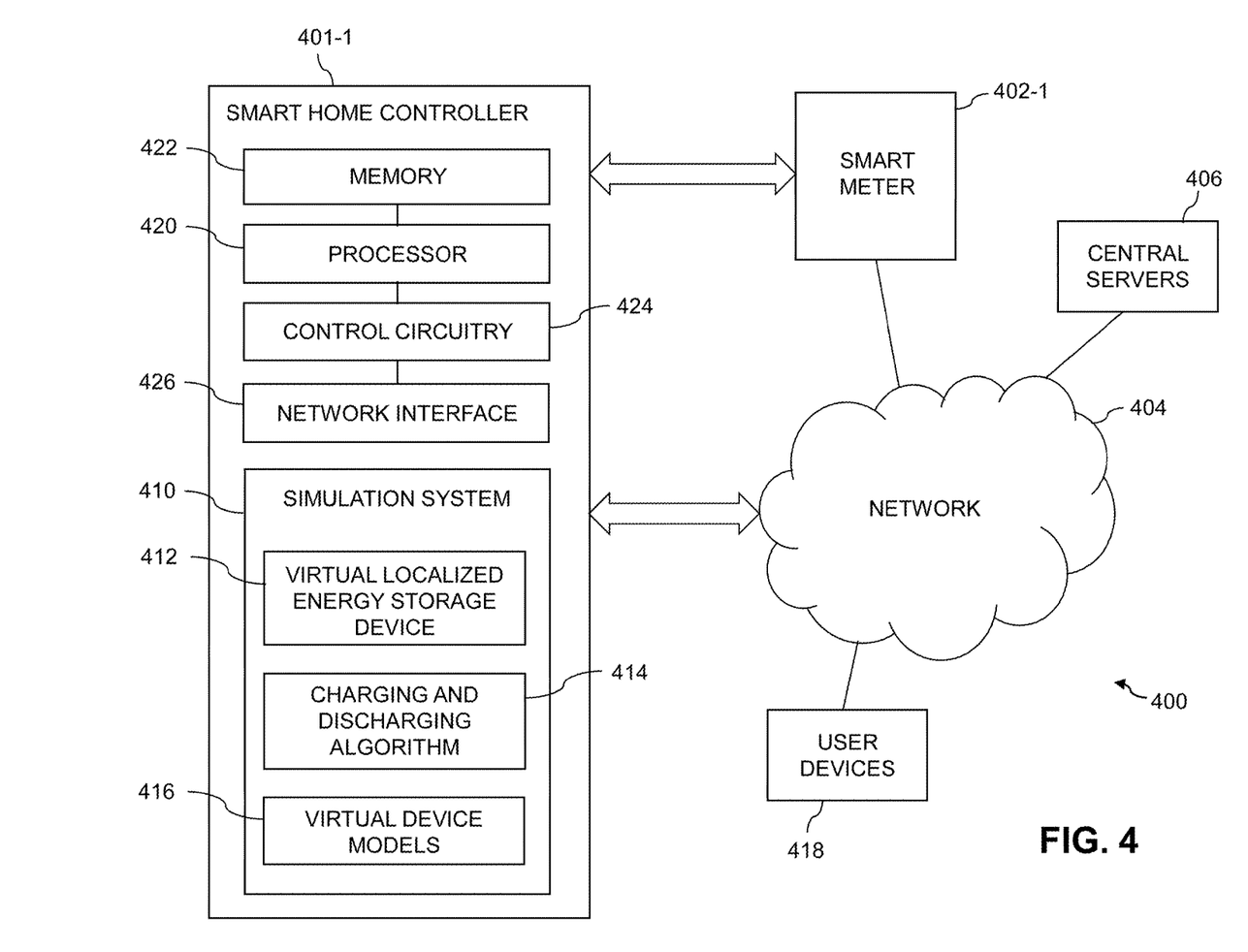
FIG. 4 shows an information processing system in which a virtual localized energy storage device is implemented in a smart home controller in an illustrative embodiment.

Another illustrative embodiment is shown in FIG. 4. In this embodiment, an information processing system 400 comprises a smart home controller 401-1 that is coupled to a smart meter 402-1. Both the smart home controller 401-1 and the smart meter 402-1 are also coupled to network 404. The network 404 provides access to central servers 406. The smart home controller 401-1 illustratively comprises a smart thermostat or other similar device that is located "behind the meter" relative to additional electrical distribution infrastructure of the electrical distribution system.

The smart home controller 401-1 in this embodiment comprises a simulation system 410 that includes virtual localized energy storage device 412, charging and discharging algorithm 414 and virtual device models 416, all configured to operate in a manner similar to that previously described above in conjunction with corresponding components 312, 314 and 316 of simulation system 310 in the FIG. 3 embodiment.

The smart home controller 401-1 is implemented at a particular energy usage location and coupled to the smart meter 402-1 at that location. The modeling of the virtual localized energy storage device 412 and execution of the algorithm 414 to control charging and discharging of the virtual localized energy storage device are implemented in one or more modules of the smart home controller 401-1.

For example, each of the components 412, 414 and 416 may be implemented as a separate module of the smart home controller 401-1. Such modules can be implemented at least in part in the form of software, although hardware and firmware can additionally or alternatively be used to implement such components of the simulation system 410.

In the FIG. 4 embodiment, the smart home controller 401-1 receives pricing data over the network 404 from one or more of the central servers 406. Energy usage data is obtained by the simulation system 410 from the smart meter 402-1 and utilized in conjunction with the pricing data in executing the algorithm 414 to operate the virtual localized energy storage device 412 in accordance with its corresponding one of the models 416.

The smart home controller 401-1 also provides an interface accessible over the network 404 to user devices 418. For example, such an interface illustratively allows a user associated with one or more of the user devices 418 to check the current charge state of the virtual localized energy storage device 412 and to adjust one or more parameters for controlling energy usage at the particular energy usage location based at least in part on the charge state of the virtual localized energy storage device 412.

The smart home controller 401-1 further comprises a processor 420, a memory 422, control circuitry 424 and a network interface 426. The processor 420, memory 422 and network interface 426 are generally configured in a manner similar to that of corresponding components 320, 322 and 326 of the FIG. 3 embodiment.

The control circuitry 424 is configured to implement conventional energy usage location control processes that are well-known to those skilled in the art. Such processes can include controlling various parameters of heating, ventilation and air conditioning (HVAC) systems, appliances and other equipment of the particular energy usage location.

The embodiments described in conjunction with FIGS. 1 through 4 and other embodiments disclosed herein can be utilized to implement smart service systems that take advantage of the availability of virtual storage to residential or business customers or other users within an electrical distribution system.

For example, a smart service system in some embodiments creates a residential energy market that will engage residential consumers and attract them to opt-in to localized energy storage. This is advantageous not only for the residential consumer, but also for the grid operator, the storage device manufacturer, and a new entity, referred to herein as a residential storage aggregator. The residential consumers will typically only opt in if there is clear value with minimal input required from the homeowner. They primarily obtain financial advantages, but there are other considerations as well, including convenience, understandability, security (e.g., localized storage ensures that they can tolerate short-term power loss due to events on the grid), and environmental stewardship. The grid operator is able to smooth its demand profile, requiring considerably less highly dispatchable but greenhouse gas intense peak power generation capacity. Further, it can leverage the significant amount of data it has about its customers to create targeted marketing opportunities for third-party businesses, such as aggregators. The storage device manufacturer will have access to new markets for its products and the ability to test designs and economics virtually (i.e., in simulation). Finally, the aggregator has access to a new market for its storage aggregation services.

A smart service system configured with virtual storage functionality in some embodiments can be used to confirm whether distributed localized storage, composed of stand-alone batteries and EVs, can be effectively operated as an integrated customer-utility application providing complementary or alternative functionality to that of a central storage facility installed at distribution feeder substations. In both cases, technical issues such as load balancing (supply-side and demand-side matching), flicker (supply-side voltage fluctuation), and others must be managed. Distribution feeders are three-phase entities, and the phases in terms of current flow on the lines must be balanced (nearly equal). If they are not, poor voltage regulation may occur causing, among other things, substation facilities to be overloaded. This is undesirable and can cause damage to facilities, which can occur even if the total three-phase feeder load is within limits. Illustrative embodiments can be configured to address these and other issues that may arise in the context of a given smart service system implementation.

It should also be noted that the potential for congestion and overload in a distribution system can severely affect reliability and has not heretofore been adequately addressed when considering market design for distributed energy resources. Accordingly, some embodiments can be configured to test alternative market designs to achieve the goal of optimal dispatch of distributed energy resources while maintaining distribution system reliability. The operation of the grid can also be simulated to satisfy line constraints, voltage constraints, and phase constraints under different market rules and incentives.

In some embodiments, installed smart meters are provided with a controllable interface for EV charging and potentially also for EV discharging, installation of bi-directional controllable battery storage, and the incorporation of existing controllable demand response such as controls for water heaters, electric heating, and other smart appliances. Some sites may have distributed generation capacity, allowing us to consider its role in the interface and test scenarios with co-located distributed generation as well.

Using the smart meters and other communication mechanisms, a central monitoring facility can be implemented. Such a central monitoring facility can comprise one or more central servers and associated computer simulation functionality, and can be at least partially cloud based. For example, the central monitoring facility can be implemented on a cloud-based processing platform such as processing platform 105 of the FIG. 1 embodiment.

A more particular but non-limiting example of a smart home configuration that may be utilized in an illustrative embodiment comprises the following:

(1) smart meter (used for net metering),
(2) 7 kW net metered solar PV system (e.g., Sunpower),
(3) 17 kW horizontal geothermal heating and cooling system with a driveway heat capture system for summer geothermal field charging,
(4) 2.5 kW solar thermal water heating system,
(5) 20 kW propane auxiliary generator with automatic transfer capability,
(6) house monitoring system that includes cameras, temperature, humidity, and $CO_2$ sensors,
(7) EV charging/discharging station,
(8) BMW i3 (30 kW) self-contained stand-alone battery,
(9) ability to control the hot water system,
(10) smart meter two-way communication,
(11) additional sensors (including safety systems) appropriate to managing the home energy use, and
(12) smart home energy management system.

Items (7) and (8) above are one example of a type of localized physical storage that can be simulated as virtual storage in this embodiment.

The smart meter of item (1) above can be implemented as smart meter 302-1 in the FIG. 3 embodiment.

Also, at least portions of the above-listed smart home configuration items may be part of or incorporate a smart home controller such as smart home controller 401-1 in the FIG. 4 embodiment. The term "smart home controller" as used herein is intended to be broadly construed to as to encompass, for example, a smart home energy management system as in item (12) above and additionally or alternatively at least portions of one or more of items (6), (7), (9), (10) and (11). Numerous other types of smart home controllers can be used in a given smart home configuration.

It is to be appreciated that this example smart home configuration is presented for purposes of illustration only, and should not be construed as limiting in any way. For example, a given residential location need not include any co-located distributed generation capability.

Also, as indicated previously, a wide variety of different types of localized storage devices, in any combination, can be simulated using corresponding virtual storage in illustrative embodiments.

Illustrative embodiments are configured to combine virtual storage and time-varying rate scenarios. For example, these embodiments can be used to model the impact of various rate scenarios on consumer behavior. A given such embodiment implements in software running on system servers one or more algorithms supporting virtual storage. This embodiment can be used to rapidly implement and study a range of scenarios involving multiple pricing structures in parallel across subsets of homes (e.g., approximately 300 homes). The system in one or more embodiments may further include an innovation feedback loop centered on the involved consumers, possibly using such consumers in simulations, or connecting with such consumers in focus groups and surveys. Embodiments of this type allow rapid testing of time-varying rate structures before seeking regulatory approvals for field-testing the rate designs. Subjective discount rates may also be considered.

In some embodiments, an example evaluation metric is to maximize the total revenue stream while ensuring a net positive revenue stream for each stakeholder (e.g., utility, aggregator, and consumer). The presence of a localized storage system may lead to a monthly demand charge reduction for the owner or aggregator, depending on storage ownership model. The cost to own and operate the storage can be modeled quite accurately within the system based on expertise of industry partners, and may additionally include a finance charge for various ownership models. Also, various market-making fees can be considered between the grid operator and aggregator/installer.

Illustrative embodiments can rapidly modify and seek to optimize various distributed storage models coupled to time-varying rate structures that lead to significant positive revenue streams. Such arrangements can be used to assess to what extent the optimal business, economic, and technology solutions are sufficiently robust and attractive to warrant further business development.

As mentioned previously, the illustrative embodiments described above are presented by way of example only, and numerous alternative embodiments are possible. For example, other embodiments can be implemented in other virtual storage simulation contexts, such as contexts involving other types of utilities, ISOs or energy service providers.

Accordingly, the embodiments described above are considered illustrative only, and should not be viewed as limited to any particular arrangement of features. For example, those skilled in the art will recognize that alternative processing operations and associated system entity configurations can be used in other embodiments. It is therefore possible that other embodiments may include additional or alternative system entities, relative to the entities of the illustrative embodiments. Also, the particular virtual localized energy storage configurations, energy usage and pricing data formats, algorithms, models and other aspects of the illustrative embodiments can be varied in other embodiments.

It should also be noted that the above-described information processing system arrangements are exemplary only, and alternative system arrangements can be used in other embodiments.

A given client, server, processor or other component in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, an ALU, a DSP, or other similar processing device component, as well as other types and arrangements of processing circuitry, in any combination.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of RAM, ROM or flash memory, as well as magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with smart metering in conjunction with virtual storage simulating localized storage, as well as other related functionality.

Smart meters or smart home controllers as those terms are broadly used herein are considered types of processing devices. As indicated previously, such a device may operate as a client relative to one or more servers in a client-server arrangement.

Processing devices in a given embodiment can additionally include, for example, laptop, tablet or desktop personal computers, mobile telephones, or other types of computers or communication devices, in any combination. For example, a computer or mobile telephone can be utilized by a user to access processing platforms associated with computer simulation of localized storage as disclosed herein.

These and other communications between the various elements of an information processing system comprising processing devices associated with respective smart meters, servers, controllers, simulators and other system entities may take place over one or more networks. Such networks can illustratively include, for example, a global computer network such as the Internet, a WAN, a LAN, a satellite network, a telephone or cable network, a cellular network, a wireless network implemented using a wireless protocol such as WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises a plurality of processing devices that communicate with one another over one or more networks. Such a processing platform in some embodiments may be implemented at least in part utilizing cloud infrastructure.

Again, these and other particular processing platforms referred to herein are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure. Thus, it is possible in some embodiments that system components, such as a simulator providing virtual storage instances for respective smart meters, can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality associated with smart meters, servers, controllers, simulators and other system entities can be implemented at least in part in the form of software.

Accordingly, a given component of an information processing system implementing virtual storage to simulate rechargeable batteries or other types of localized storage devices as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. Thus, techniques illustrated in some embodiments herein in the context of providing virtual storage to simulate rechargeable batteries or other types of localized storage devices in an electrical distribution system can be adapted in a straightforward manner for use in other contexts involving different types of utilities, ISOs or other energy service providers. The disclosed virtual storage techniques can be similarly adapted for use in a wide variety of other types of information processing systems. Accordingly, embodiments of the invention should not be viewed as being limited to any particular type of power grid, electrical distribution system, smart meter configuration or their associated processing contexts.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and devices than those utilized in the particular illustrative embodiments described herein, and in numerous alternative virtual storage contexts. In addition, the particular assumptions made herein in the context of describing certain embodiments need not apply in other embodiments. These and numerous other alternative embodiments will be readily apparent to those skilled in the art.

What is claimed is:

1. An apparatus comprising:
at least one processing device comprising a processor coupled to a memory;
the processing device being configured:
to obtain energy usage data generated by advanced metering infrastructure of a particular energy usage location of an electrical distribution system;
to model a virtual localized energy storage device for the particular energy usage location, the virtual localized energy storage device being a non-physical energy storage device;
to execute an algorithm to control charging and discharging of the virtual localized energy storage device based at least in part on the energy usage data and associated pricing data of the electrical distribution system; and
to provide an interface through which a user can adjust one or more parameters for controlling energy usage at the particular energy usage location based at least in part on a charge state of the virtual localized energy storage device.

2. The apparatus of claim 1 wherein the virtual localized energy storage device does not include any localized energy storage device that is physically present at the particular energy usage location.

3. The apparatus of claim 1 wherein the advanced metering infrastructure comprises at least one smart meter implemented at the particular energy usage location.

4. The apparatus of claim 1 wherein the particular energy usage location comprises a residence of a residential user.

5. The apparatus of claim 1 wherein the processing device is part of a cloud-based processing platform configured to receive the energy usage data and the associated pricing data over one or more networks.

6. The apparatus of claim 1 wherein the processing device is part of the advanced metering infrastructure of the particular energy usage location.

7. The apparatus of claim 6 wherein the processing device comprises a smart meter of the advanced metering infrastructure and modeling of the virtual localized energy storage device and execution of the algorithm to control charging and discharging of the virtual localized energy storage device are implemented in one or more modules of the smart meter.

8. The apparatus of claim 1 wherein the processing device comprises a smart home controller implemented at the particular energy usage location and coupled to the advanced metering infrastructure of the particular energy usage location and further wherein modeling of the virtual localized energy storage device and execution of the algorithm to control charging and discharging of the virtual localized energy storage device are implemented in one or more modules of the smart home controller.

9. The apparatus of claim 1 wherein the energy usage data is received from the advanced metering infrastructure of the particular energy usage location at predefined intervals.

10. The apparatus of claim 1 wherein the virtual localized energy storage device is modeled at least in part as at least one of:
one or more rechargeable batteries; and
one or more electric vehicles;
each providing a particular energy storage capacity.

11. The apparatus of claim 1 wherein modeling of the virtual localized energy storage device comprises specifying total energy storage capacity, charging and discharging rates, and potentially one or more of internal dissipation, duty cycle effects and performance degradation over time for the virtual localized energy storage device.

12. The apparatus of claim 1 wherein the algorithm is configured to favor charging the virtual localized energy storage device at times when the pricing data indicates that a price per unit of energy is relatively low and is configured to favor discharging the virtual localized energy storage device at times when the pricing data indicates that the price per unit of energy is relatively high.

13. The apparatus of claim 1 wherein the algorithm is configured to control charging and discharging of the virtual localized energy storage device in a manner that attempts to minimize a total cost for energy usage at the particular energy usage location.

14. The apparatus of claim 1 wherein separate instances of the virtual localized energy storage device are implemented by the one or more processing devices for respective ones of a plurality of energy usage locations of the electrical distribution system.

15. The apparatus of claim 14 wherein the separate instances of the virtual localized energy storage devices are scaled to simulate physical deployment of a distributed arrangement of actual localized energy storage devices across potentially large numbers of respective energy usage locations of the electrical distribution system without requiring deployment of the actual localized energy storage devices at any of the energy usage locations.

16. The apparatus of claim 1 wherein the interface comprises a web-based portal accessible via another processing device over a network.

17. A method comprising:
obtaining energy usage data generated by advanced metering infrastructure of a particular energy usage location of an electrical distribution system;
modeling a virtual localized energy storage device for the particular energy usage location, the virtual localized energy storage device being a non-physical energy storage device;
executing an algorithm to control charging and discharging of the virtual localized energy storage device based at least in part on the energy usage data and associated pricing data of the electrical distribution system; and
providing an interface through which a user can adjust one or more parameters for controlling energy usage at the particular energy usage location based at least in part on a charge state of the virtual localized energy storage device;
wherein the method is performed by at least one processing device comprising a processor coupled to a memory.

18. The method of claim 17 wherein the algorithm is configured to favor charging the virtual localized energy storage device at times when the pricing data indicates that a price per unit of energy is relatively low and is configured to favor discharging the virtual localized energy storage device at times when the pricing data indicates that the price per unit of energy is relatively high.

19. A computer program product comprising a non-transitory processor-readable storage medium having stored therein program code of one or more software programs, wherein the program code when executed by at least one processing device causes said at least one processing device:
to obtain energy usage data generated by advanced metering infrastructure of a particular energy usage location of an electrical distribution system;

to model a virtual localized energy storage device for the particular energy usage location, the virtual localized energy storage device being a non-physical energy storage device;

to execute an algorithm to control charging and discharging of the virtual localized energy storage device based at least in part on the energy usage data and associated pricing data of the electrical distribution system; and to provide an interface through which a user can adjust one or more parameters for controlling energy usage at the particular energy usage location based at least in part on a charge state of the virtual localized energy storage device.

20. The computer program product of claim 19 wherein the algorithm is configured to favor charging the virtual localized energy storage device at times when the pricing data indicates that a price per unit of energy is relatively low and is configured to favor discharging the virtual localized energy storage device at times when the pricing data indicates that the price per unit of energy is relatively high.

* * * * *